(12) United States Patent
Kim et al.

(10) Patent No.: US 12,505,373 B2
(45) Date of Patent: Dec. 23, 2025

(54) CALIBRATION OF TWO QUBIT GATES INVOLVED IN PARALLEL OPERATIONS

(71) Applicant: International Business Machines Corporation, Armonk, NY (US)

(72) Inventors: Youngseok Kim, Upper Saddle River, NJ (US); Xuan Wei, White Plains, NY (US); Isaac Lauer, Chappaqua, NY (US); Abhinav Kandala, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 18/212,947

(22) Filed: Jun. 22, 2023

(65) Prior Publication Data
US 2025/0005412 A1    Jan. 2, 2025

(51) Int. Cl.
*G06N 10/40*    (2022.01)

(52) U.S. Cl.
CPC ..................... *G06N 10/40* (2022.01)

(58) Field of Classification Search
None
See application file for complete search history.

(56) References Cited

U.S. PATENT DOCUMENTS

| | | | |
|---|---|---|---|
| 10,572,816 B1 | 2/2020 | Vavilov et al. | |
| 10,643,143 B2 | 5/2020 | Bloom et al. | |
| 10,692,009 B2 | 6/2020 | Kelly | |
| 2022/0027773 A1 | 1/2022 | Smelyanskiy et al. | |
| 2022/0374751 A1 | 11/2022 | Huang et al. | |
| 2024/0346352 A1* | 10/2024 | Bluvstein | G06N 10/70 |

FOREIGN PATENT DOCUMENTS

| | | | | |
|---|---|---|---|---|
| WO | 2021168019 A1 | 8/2021 | | |
| WO | 2021178562 A1 | 9/2021 | | |
| WO | WO-2024179671 A1 * | 9/2024 | | G06N 10/70 |
| WO | WO-2024242728 A2 * | 11/2024 | | G06N 10/70 |

OTHER PUBLICATIONS

Satoh et al., "Pulse-Engineered Controlled-V Gate and Its Applications on Superconducting Quantum Device," arXiv:2102.06117v3, Apr. 27, 2022, pp. 1-9.

\* cited by examiner

*Primary Examiner* — Anh Q Tran
(74) *Attorney, Agent, or Firm* — Shackelford, McKinley & Norton, LLP; Robert A. Voigt, Jr.

(57) ABSTRACT

A method, system and computer program product for calibrating a quantum operation. Layers of two qubit gates that operate in parallel are defined. A gate length for each two qubit gate in a layer of the defined layers is calibrated to correspond to the same gate length, such as the gate length of the two qubit gate in that layer with the slowest operation speed. A portion of the quantum operation is performed by the two qubit gates in the layer with the calibrated gate length. In this manner, two qubit gates that operate in parallel are effectively calibrated in a manner that results in better gate fidelities, fewer frequency collisions and fewer undesirable transitions.

20 Claims, 6 Drawing Sheets

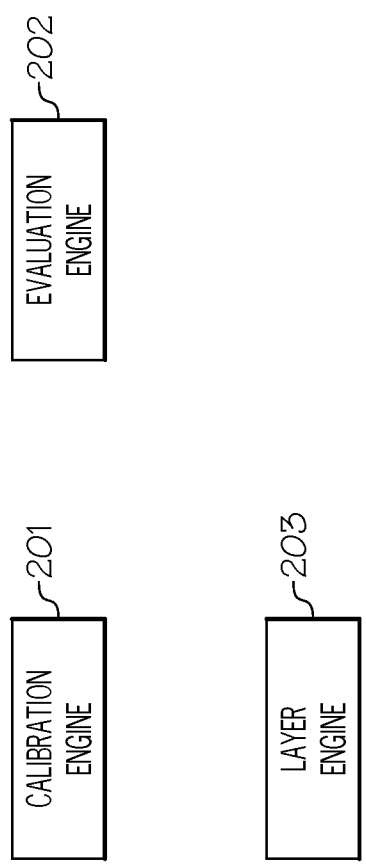

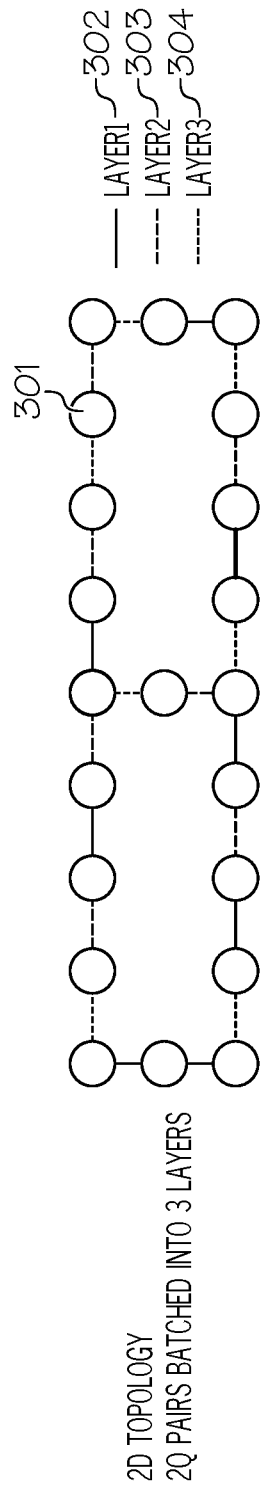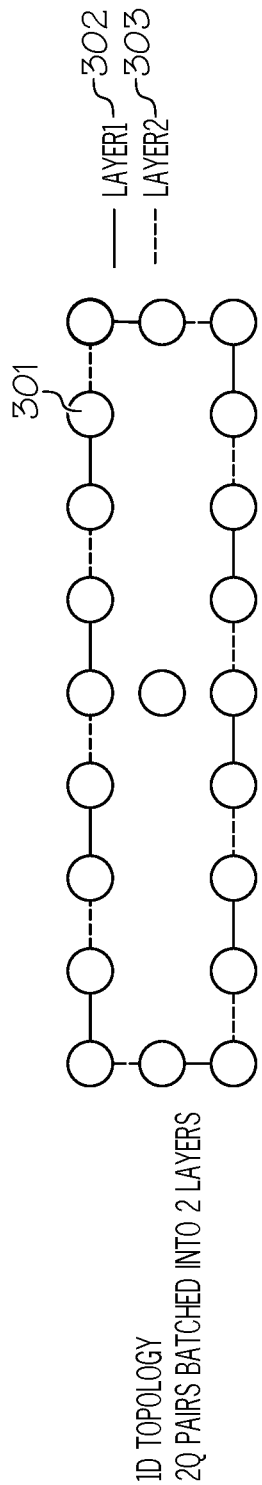

CALIBRATION OF TWO QUBIT GATES INVOLVED IN PARALLEL OPERATIONS

TECHNICAL FIELD

The present disclosure relates generally to quantum gate calibration, and more particularly to calibrating two qubit gates involved in parallel two qubit gate operations.

BACKGROUND

Quantum computing is a type of computation that harnesses the collective properties of quantum states, such as superposition, interference, and entanglement, to perform calculations. The devices that perform quantum computations are known as quantum computers. Though current quantum computers are too small to outperform usual (classical) computers for practical applications, they are believed to be capable of solving certain computational problems, such as integer factorization, substantially faster than classical computers.

There are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit," which is somewhat analogous to the bit in classical computation. A qubit can be in a 1 or 0 quantum state, or in a superposition of the 1 and 0 states. When the state of the qubit is measured from the execution of the quantum circuit, however, it is always 0 or 1 where the probability of either outcome depends on the qubit's quantum state immediately prior to measurement. That is, the qubit state collapses into either the quantum state of 0 (represented as "$|0\le$") or the quantum state of 1 (represented as "$|1\le$").

The building blocks of quantum circuits are quantum logic gates (or simply referred to herein as "quantum gates" or "gates") which operate on a small number of qubits. Unlike many classical logic gates, quantum logic gates are reversible. It is possible to perform classical computing using only reversible gates. For example, the reversible Toffoli gate can implement all Boolean functions, often at the cost of having to use ancilla bits. The Toffoli gate has a direct quantum equivalent, showing that quantum circuits can perform all operations performed by classical circuits.

In certain quantum devices (devices whose functionality or principles of operation depend essentially on quantum mechanical effects), the quantum circuits may utilize cross-resonance (CR) gates. A CR gate is a microwave-active two qubit gate performed by driving one of the qubits (control) at the frequency of the other qubit (target). The qubits are connected through effective capacitors in a superconducting circuit. The CR drive protocol produces entanglement between the qubits mainly through an interaction of the form ZX (rotation of the two-qubit wavefunction around the Z-X axis).

As the size of quantum devices becomes larger and larger by utilizing a larger number of quantum circuits, such devices may exploit the parallel operation of two qubit quantum gates, such as the parallel operation of CR gates.

In order to optimize the CR gate fidelity, such CR gates need to be calibrated. The gate fidelity is a metric of the accuracy of the quantum gate. That is, gate fidelity is a measure of how close the final quantum state of the real-life qubit is to the ideal case. If the fidelity of the quantum gate is too low, calculations will fail because errors will accumulate faster than they can be corrected. Calibration is a technique to reduce systematic errors in quantum circuits.

Quantum gates, such as CR gates, are currently calibrated (e.g., adjusting gate pulse parameters) using the "as fast as possible" (AFAP) calibration technique to reduce errors (e.g., errors associated with qubit decay or loss of phase information) which involves calibrating the CR gates to perform its operation as fast as possible. Such a technique is beneficial in locating a patch, which represents a set of qubits required for a given quantum circuit in the quantum device. The selected patch may include faster gates compared with other possible patches thereby providing higher quality results for the limited coherence time of qubits.

However, in quantum circuits containing a large number of quantum gates, such as CR gates, especially for those quantum circuits performing parallel two qubit gate operations, the length of each parallel two qubit gate operation is eventually limited by the quantum gate (e.g., CR gate) with the slowest operation speed. Therefore, the quantum circuit with parallel two qubit gate operations may not benefit from the fast gates tuned up by the AFAP calibration technique as the parallel operation results in additional idle time for those fast gates until the slowest gate of that particular parallel operation has completed its operation.

Furthermore, quantum devices, such as CR devices, suffer from frequency collisions, in which the ZX may be suppressed or other undesirable effects arise. Unfortunately, the current AFAP calibration technique may fail to address such collisions.

Among the possible collisions mentioned above, in the parallel two qubit gate operation setting, other non-ideal two-photon processes that induce undesirable transitions can occur. When such undesirable transitions occur, the error rate may increase. Unfortunately, the current AFAP calibration technique fails to address such undesirable transitions.

SUMMARY

In one embodiment of the present disclosure, a method for calibrating a quantum operation comprises defining layers of a collection of two qubit gates that operate in parallel. The method further comprises calibrating a gate length of two qubit gates in a layer of the defined layers to correspond to a same gate length. The method additionally comprises performing at least a portion of the quantum operation by the two qubit gates in the layer of the defined layers with the calibrated gate length.

Additionally, in one embodiment of the present disclosure, the gate length of the two qubit gates in the layer of the defined layers is calibrated to correspond to a gate length of a two qubit gate in the layer with a slowest operation speed.

Furthermore, in one embodiment of the present disclosure, the defined layers comprise directionality of two qubit gates in each layer of the defined layers, where the directionality specifies which of the two qubits correspond to a drive control qubit and which of the two qubits correspond to a target qubit.

Additionally, in one embodiment of the present disclosure, the method further comprises performing a Hamiltonian tomography on a two qubit gate to obtain a ZX rate as a function of a cross-resonance drive amplitude. The method additionally comprises defining a gate amplitude to correspond to a fraction of the ZX rate. Furthermore, the method comprises setting a width of the two qubit gate based on the gate amplitude.

Furthermore, in one embodiment of the present disclosure, the method additionally comprises evaluating operational performance of a plurality of two qubit gates based on the width set for each of the plurality of two qubit gates. The method further comprises identifying a two qubit gate of the plurality of two qubit gates with a slowest operation speed.

Additionally, in one embodiment of the present disclosure, the method further comprises defining layers of the plurality of two qubit gates in response to the two qubit state with the slowest operation speed exceeding a threshold gate speed.

Furthermore, in one embodiment of the present disclosure, the method additionally comprises evaluating operational performance of the two qubit gates in the layer of the defined layers. The method further comprises deploying the two qubit gates in the layer of the defined layers to perform at least the portion of the quantum operation in response to the operational performance exceeding a threshold value. Furthermore, the method comprises modifying one or more layers of the defined layers of the collection of two qubit gates that operate in parallel in response to the operational performance not exceeding the threshold value.

Other forms of the embodiments of the method described above are in a system and in a computer program product.

Accordingly, embodiments of the present disclosure effectively calibrate two qubit gates that operate in parallel in a manner that results in better gate fidelities, fewer frequency collisions and fewer undesirable transitions.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 2 is a diagram of the software components of the classical system for effectively calibrating two qubit gates that operate in parallel in accordance with an embodiment of the present disclosure;

FIG. 3A illustrates a two-dimensional topology consisting of two qubit gates that are batched into 3 layers in accordance with an embodiment of the present disclosure;

FIG. 3B illustrates a one-dimensional topology consisting of two qubit gates that are batched into 2 layers in accordance with an embodiment of the present disclosure;

DETAILED DESCRIPTION

Figure 1:
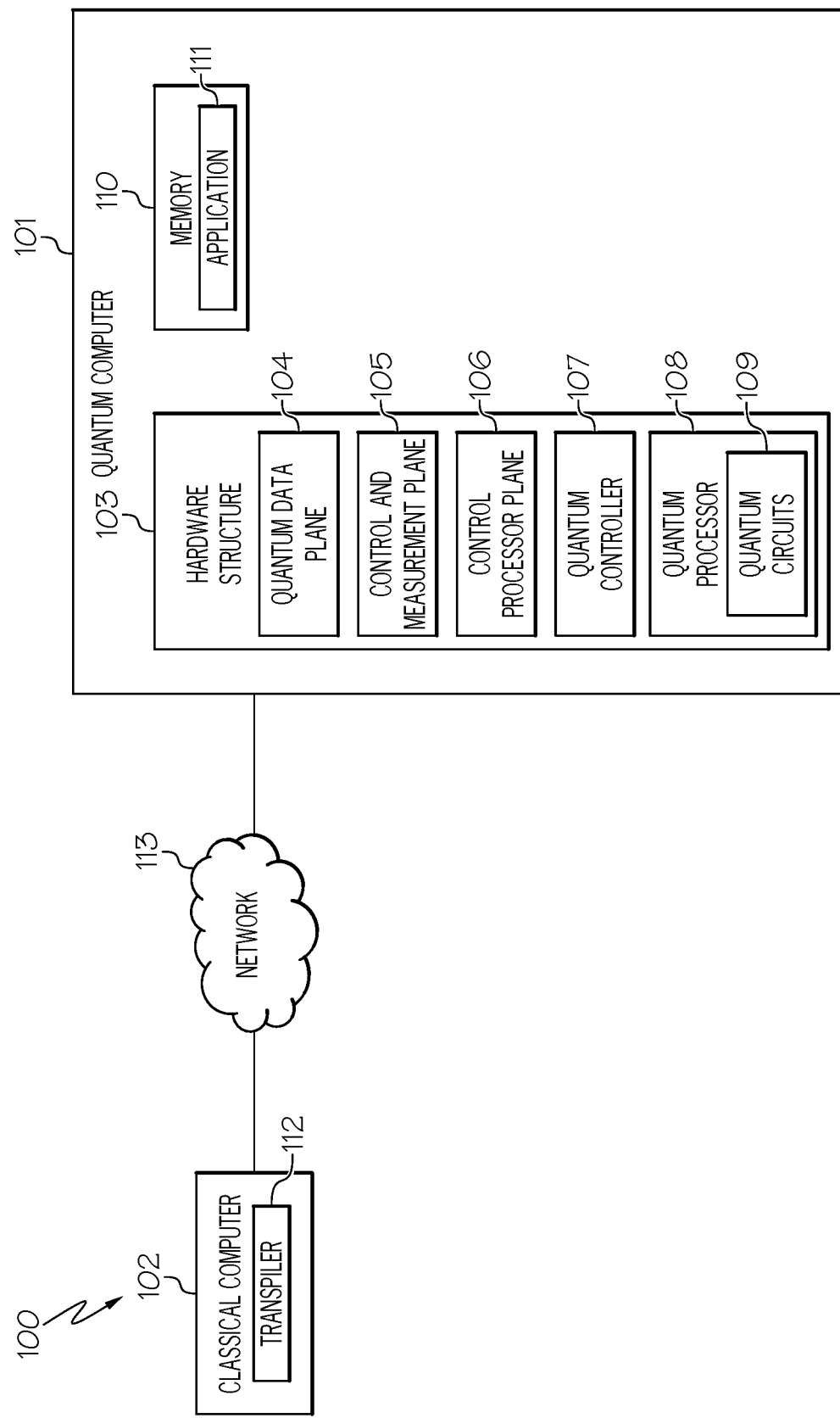
FIG. 1 illustrates a communication system for practicing the principles of the present disclosure in accordance with an embodiment of the present disclosure.

As stated in the Background section, the building blocks of quantum circuits are quantum logic gates (or simply referred to herein as "quantum gates" or "gates") which operate on a small number of qubits. Unlike many classical logic gates, quantum logic gates are reversible. It is possible to perform classical computing using only reversible gates. For example, the reversible Toffoli gate can implement all Boolean functions, often at the cost of having to use ancilla bits. The Toffoli gate has a direct quantum equivalent, showing that quantum circuits can perform all operations performed by classical circuits.

In certain quantum devices (devices whose functionality or principles of operation depend essentially on quantum mechanical effects), the quantum circuits may utilize cross-resonance (CR) gates. A CR gate is a microwave-active two qubit gate performed by driving one of the qubits (control) at the frequency of the other qubit (target). The qubits are connected through effective capacitors in a superconducting circuit. The CR drive protocol produces entanglement between the qubits mainly through an interaction of the form ZX (rotation of the two-qubit wavefunction around the Z-X axis).

As the size of quantum devices becomes larger and larger by utilizing a larger number of quantum circuits, such devices may exploit the parallel operation of two qubit quantum gates, such as the parallel operation of CR gates.

In order to optimize the CR gate fidelity, such CR gates need to be calibrated. The gate fidelity is a metric of the accuracy of the quantum gate. That is, gate fidelity is a measure of how close the final quantum state of the real-life qubit is to the ideal case. If the fidelity of the quantum gate is too low, calculations will fail because errors will accumulate faster than they can be corrected, Calibration is a technique to reduce systematic errors in quantum circuits.

Quantum gates, such as CR gates, are currently calibrated (e.g., adjusting gate pulse parameters) using the "as fast as possible" (AFAP) calibration technique to reduce errors (e.g., errors associated with qubit decay or loss of phase information) which involves calibrating the CR gates to perform its operation as fast as possible. Such a technique is beneficial in locating a patch, which represents a set of qubits required for a given quantum circuit in the quantum device. The selected patch may include faster gates compared with other possible patches thereby providing higher quality results for the limited coherence time of qubits.

However, in quantum circuits containing a large number of quantum gates, such as CR gates, especially for those quantum circuits performing parallel two qubit gate operations, the length of each parallel two qubit gate operation is eventually limited by the quantum gate (e.g., CR gate) with the slowest operation speed. Therefore, the quantum circuit with parallel two qubit gate operations may not benefit from the fast gates tuned up by the AFAP calibration technique as the parallel operation results in additional idle time for those fast gates until the slowest gate of that particular parallel operation has completed its operation.

Furthermore, quantum devices, such as CR devices, suffer from frequency collisions, in which the ZX may be suppressed or other undesirable effects arise. Unfortunately, the current AFAP calibration technique may fail to address such collisions.

Among the possible collisions mentioned above, in the parallel two qubit gate operation setting, other non-ideal two-photon processes that induce undesirable transitions can occur. When such undesirable transitions occur, the error rate may increase. Unfortunately, the current AFAP calibration technique fails to address such undesirable transitions.

The embodiments of the present disclosure provide the means for effectively calibrating two qubit gates that operate in parallel that results in better gate fidelities, fewer frequency collisions and fewer undesirable transitions. In one embodiment, layers of a collection of two qubit gates, such as cross-resonance (CR) gates that operate in parallel, are defined. The gate length of the two qubit gates in each defined layer is calibrated to correspond to the same gate length, such as the gate length of the two qubit gate in that layer with the slowest operation speed that exceeds a user-designated operation speed thereby ensuring that the quantum circuit operates at a minimum speed. The "gate length," as used herein, refers to the time needed to execute the quantum gate. By having each two qubit gate operate with the same gate length as the two qubit gate with the slowest operation speed, which exceeds a user-designated operation speed, undesirable transitions (and therefore increases in the error rates) and frequency collisions are reduced or prevented. These and other features will be discussed in further detail below.

In some embodiments of the present disclosure, the present disclosure comprises a method, system and computer program product for calibrating a quantum operation. In one embodiment of the present disclosure, layers of two qubit gates that operate in parallel are defined. A "layer," as used herein, refers to a set of two qubit gates that operate in parallel, including simultaneously. Each layer may be used to perform a portion of the quantum operation. In one embodiment, such layers of operation are defined based on qubit frequency arrangements and collision counting. In one embodiment, a gate length for each two qubit gate in a layer of the defined layers is calibrated to correspond to the same gate length. In one embodiment, the gate length of the two qubit gates in each layer of the defined layers is calibrated to correspond to the same gate length as the gate length of the two qubit gate in that layer with the slowest operation speed. A portion of the quantum operation is performed by the two qubit gates in the layer with the calibrated gate length. In this manner, by having the two qubit gates with the same identical gate length, gate calibrations can be parallelized based on error amplification sequences, which could reduce calibration time as well as calibrate out the error associated with simultaneous two qubit gate operations thereby improving gate fidelities. Furthermore, in this manner, by having the two qubit gates with the same gate length as the gate length of the two qubit gate in that layer with the slowest operation speed, collisions suffered from CR devices are reduced thereby improving gate fidelities. For example, by slowing the operations of the two qubit gates, the collision bounds are relaxed and the strength of the stark effect (change in the quantized energy in a qubit when an electrical field is applied across the qubit) is reduced thereby reducing collisions. Additionally, in this manner, by having the two qubit gates with the same gate length as the gate length of the two qubit gate in that layer with the slowest operation speed, errors caused by undesirable transitions from parallel two qubit gate operations are reduced thereby improving gate fidelities.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to setup the state of quantum bits in quantum computer 101 and then quantum computer 101 starts the quantum process. Furthermore, in one embodiment, classical computer 102 is configured to effectively calibrate two qubit gates (e.g., CR gates) that operate in parallel in a manner that results in better gate fidelities, fewer frequency collisions and fewer undesirable transitions as discussed further below.

In one embodiment, a hardware structure 103 of quantum computer 101 includes a quantum data plane 104, a control and measurement plane 105, a control processor plane 106, a quantum controller 107 and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gate, are all reversible. Examples of quantum logic gates include RX (performs $e^{i\theta X}$, which corresponds to a rotation of the qubit state around the X-axis by the given angle theta θ on the Bloch sphere), RY (performs $e^{i\theta Y}$, which corresponds to a rotation of the qubit state around the Y-axis by the given angle theta θ on the Bloch sphere), RXX (performs the operation $e^{(-i\theta/2 X \oplus X)}$ on the input qubit), RZZ (takes in one input, an angle theta θ expressed in radians, and it acts on two qubits), etc. In one embodiment, quantum circuits 109 are written such that the horizontal axis is time, starting at the left hand side and ending at the right hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for effectively calibrating two qubit gates (e.g., CR gates) that operate in parallel in a manner that results in better gate fidelities, fewer frequency collisions and fewer undesirable transitions as discussed further below in connection with FIGS. 2, 3A-3B and 5A-5B. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to setup the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to effectively calibrate two qubit gates (e.g., CR gates) that operate in parallel in a manner that results in better gate fidelities, fewer frequency collisions and fewer undesirable transitions as discussed further below in connection with FIGS. 2, 3A-3B and 5A-5B. A description of the software components of classical computer 102 is provided below in connection with FIG. 2 and a description of the hardware configuration of classical computer 102 is provided further below in connection with FIG. 4.

System 100 is not to be limited in scope to any one particular network architecture. System 100 may include any number of quantum computers 101, classical computers 102 and networks 113.

A discussion regarding the software components used by classical computer 102 for effectively calibrating two qubit gates (e.g., CR gates) that operate in parallel is provided below in connection with FIG. 2.

FIG. 2 is a diagram of the software components of classical system 102 (FIG. 1) for effectively calibrating two qubit gates (e.g., CR gates) that operate in parallel in accordance with an embodiment of the present disclosure.

Referring to FIG. 2, in conjunction with FIG. 1, classical computer 102 includes a calibration engine 201 configured to perform an initial calibration of the two qubit gates (e.g., CR gates) of the quantum circuit (e.g., quantum circuit 109) by performing a Hamiltonian tomography.

In one embodiment, such two qubit gates correspond to CR gates. In one embodiment, such CR gates correspond to echoed-CR gates. An echoed-CR gate, as used herein, refers to a CR gate that is operated by a πL pulse on the control qubit and a change of sign of the CR drive. In such a scheme, an echo pulse sequence is utilized, which consists of two CR pulses with opposite amplitude, accompanied with π rotations on the control qubit. The echo creates constructive/destructive interference between the effective gate parameters.

In one embodiment, calibration engine 201 performs the Hamiltonian tomography to obtain the ZX rate (rotation of the two-qubit wavefunction around the Z-X axis) as a function of the cross-resonance drive amplitude. Hamiltonian tomography, as used herein, refers to performing tomography on a two-qubit gate operation to obtain the ZX rate. In one embodiment, calibration engine 201 defines the gate amplitude as corresponding to a user-designated fraction (e.g., half) of the ZX rate. In one embodiment, calibration engine 201 sets a width of the two qubit gate (e.g., CR gate) based on the gate amplitude. The "width," as used herein, refers to the frequency range of operation.

After utilizing the Hamiltonian tomography for deciding the width for each two qubit gate utilized by the quantum circuit (e.g., quantum circuit 109), the operational performance (e.g., gate speed, fidelity (accuracy), two-qubit gate error, etc.) of the two qubit gates are evaluated by an evaluation engine 202 of classical computer 102 based on the width for each two qubit gate. For example, the operational performance, such as gate speed, for each two qubit gate is evaluated by an evaluation engine 202 of classical computer 102 based on the width for each two qubit gate. The "gate speed" (also referred to herein as the "operation rate" or the "operation speed"), as used herein, refers to the execution rate of the gate (e.g., 20 ns). That is, the "gate speed" corresponds to the duration of time it takes the quantum gate to operate on the qubits, such as two qubits for the two qubit gate.

In one embodiment, evaluation engine 202 performs such an evaluation using various software tools, including, but not limited to, Benchmarking Suite by QPL, Quantum Benchmark by Keysight Technologies®, MQT Bench, etc.

In one embodiment, based on evaluating the gate speed (operation speed), evaluation engine 202 identifies the two qubit gate with the slowest operation speed. That is, evaluation engine 202 identifies the two qubit gate with the lowest operation speed.

Evaluation engine 202 then determines whether the identified slowest operation speed exceeds a user-designated threshold gate speed to ensure that the quantum circuit (e.g., quantum circuit 109) operates at least above a minimum speed of operation. As discussed above, in quantum circuits containing a large number of quantum gates, such as CR gates, especially for those quantum circuits performing parallel two qubit gate operations, the performance of the quantum circuit is limited by the quantum gate with the slowest operation speed. As a result, by ensuring that the two qubit gate with the slowest operation speed exceeds a minimum gate speed (user-designated threshold), it is ensured that the performance of the quantum circuit exceeds such a minimum speed of operation. Hence, the overall performance of the quantum circuit can be improved by ensuring that it performs no slower than the minimum speed of operation that is exceeded by the two qubit gate with the slowest operation speed.

If the operation speed of the two qubit gate with the slowest operation speed does not exceed the threshold gate speed, which may be user-designated, then evaluation engine 202 adjusts the qubit frequency. For example, the qubit frequency may be adjusted from 5.100 GHz to 5.110 GHz.

In one embodiment, evaluation engine 202 adjusts the qubit frequency by modifying a small magnetic field applied to the quantum device (e.g., quantum computer 101) with the quantum circuit (e.g., quantum circuit 109) of the two qubit gates previously evaluated.

In one embodiment, evaluation engine 202 adjusts the qubit frequency using a bias current from control and measurement plane 105.

In one embodiment, evaluation engine 202 adjusts the qubit frequency using laser-annealing, in which a laser beam is applied to the Josephson junction (JJ) in order to tune the qubit frequency.

Upon adjusting the qubit frequency, calibration engine 201 calibrates the two qubit gates (e.g., CR gates) of the quantum circuit (e.g., quantum circuit 109) operating at the adjusted qubit frequency by performing a Hamiltonian tomography as discussed above.

If, however, the operation speed of the two qubit gate with the slowest operation speed exceeds the threshold gate speed, which may be user-designated, then layer engine 203 of classical computer 102 defines the layers of the two qubit gates that operate in parallel. A "layer," as used herein, refers to a set of two qubit gates that operate in parallel, including simultaneously. Each layer may be used to perform a portion of the quantum operation.

In one embodiment, the layer definition includes a directionality of the two qubit gates in each layer of the defined layers. In one embodiment, directionality specifies which of the two qubits correspond to a drive control qubit and which of the two qubits correspond to a target qubit. The drive control qubit is used to encode the logical qubit. The state of the target qubit is based on the state of the control qubit.

In one embodiment, layer engine 203 defines each layer of operation to perform a portion of an operation by batching two qubit gates in parallel. In one embodiment, such layers are based on the type of topology to be implemented. For example, in the heavy-hex topology, there is a minimum of 3 layers of two qubit gates that are batched together.

In one embodiment, such layers of operation are defined based on qubit frequency arrangements and collision counting. A "collision," as used herein, refers to a frequency collision in which neighboring qubits having the wrong detuning will exhibit a frequency collision in which the ZX may be suppressed or other undesirable effects arise.

In one embodiment, layer engine 203 estimates the collisions based on the Monte Carlo frequency-crowding model as a function of $6f$. In one embodiment, it is assumed that the qubit frequencies are distributed normally around their design frequencies with standard deviation $6f$.

In one embodiment, layer engine 203 estimates the collisions based on simulating the probability of frequency collisions between gate transitions based on the two qubit gates driven by parametric modulation of tunable couplers.

In one embodiment, two qubit gates are batched together in a layer of operation based on being operated at the same or substantially similar qubit frequency and/or based on having the minimal amount of collisions by being batched together.

In conjunction with defining the layers of operations, such as with two qubit gates that operate in parallel, including simultaneously, calibration engine 201 calibrates a gate length of the two qubit gates in each layer of the defined layers to correspond to the same gate length. In one embodiment, calibration engine 201 calibrates the gate length of the two qubit gates in each layer of the defined layers to correspond to the same gate length as the gate length of the two qubit gate in that layer with the slowest operation speed. In one embodiment, the gate length of the two qubit gates in each layer of the defined layers is calibrated to a different gate length.

In this manner, by having the two qubit gates with the same identical gate length, gate calibrations can be parallelized based on error amplification sequences, which could reduce calibration time as well as calibrate out the error associated with simultaneous two qubit gate operations thereby improving gate fidelities.

Furthermore, in this manner, by having the two qubit gates with the same gate length as the gate length of the two qubit gate in that layer with the slowest operation speed, collisions suffered from CR devices are reduced thereby improving gate fidelities. For example, by slowing the operations of the two qubit gates, the collision bounds are relaxed and the strength of the stark effect (change in the quantized energy in a qubit when an electrical field is applied across the qubit) is reduced thereby reducing collisions.

Additionally, in this manner, by having the two qubit gates with the same gate length as the gate length of the two qubit gate in that layer with the slowest operation speed, errors caused by undesirable transitions from parallel two qubit gate operations are reduced thereby improving gate fidelities.

In one embodiment, layer engine 203 optimizes calibrations for different circuit topologies on the same device map. In one embodiment, layer engine 203 implements different optimal layers for different topologies of the qubits. In one embodiment, different optimal layers may utilize a different slowest gate. Hence, the optimal gate speeds may vary across the layers.

An illustration of the different layers of operation for different topologies is provided in FIGS. 3A-3B.

FIG. 3A illustrates a two-dimensional topology consisting of two qubit gates (e.g., CR gates) that are batched into 3 layers in accordance with an embodiment of the present disclosure.

As shown in FIG. 3A, two qubit gates 301 are batched into layer 1 (302), layer 2 (303) and layer 3 (304).

FIG. 3B illustrates a one-dimensional topology consisting of two qubit gates (e.g., CR gates) that are batched into 2 layers in accordance with an embodiment of the present disclosure.

As shown in FIG. 3B, two qubit gates 301 are batched into layer 1 (302) and layer 2 (303).

In one embodiment, layer engine 203 utilizes various software tools for defining such layers of operations, including, but not limited to, TensorFlow® Quantum, Cirq® Quantum Software Framework, etc.

Upon calibrating the gate length of the two qubit gates in each layer of the defined layers to correspond to the same gate length, such as the gate length of the slowest gate in that layer, evaluation engine 202 evaluates the operation performance (e.g., fidelity, two-qubit gate error, etc.) of the two qubit gates in each of the defined layers.

In one embodiment, evaluation engine 202 performs such an evaluation using various software tools, including, but not limited to, Benchmarking Suite by QPL, Quantum Benchmark by Keysight Technologies®, MQT Bench, etc.

In one embodiment, evaluation engine 202 determines whether the operational performance (e.g., gate fidelity) of the two qubit gates in each of the defined layers exceeds a threshold value (e.g., 99%), which may be user-designated. As discussed above, gate fidelity is a metric of the accuracy of the quantum gate. That is, gate fidelity is a measure of how close the final quantum state of the real-life qubit is to the ideal case.

If the operational performance of the two qubit gates in the layer of the defined layers does not exceed the threshold value (e.g., 99%), then evaluation engine 202 determines whether a modification of the layer(s) of the defined layers could improve operational performance.

In one embodiment, such an evaluation is performed based on evaluating the operational performance of the two qubit gates in a layer(s) that has been modified via simulation by layer engine 203, such as by adding or deleting two qubit gates that operate in parallel in such a layer. In one embodiment, such simulated modifications are performed by layer engine 203 utilizing various software tools for defining such layers of operations, including, but not limited to, TensorFlow® Quantum, Cirq® Quantum Software Framework, etc. In one embodiment, the performance of such simulated modifications are evaluated by evaluation engine 202 using various software tools, including, but not limited to, Benchmarking Suite by QPL, Quantum Benchmark by Keysight Technologies®, MQT Bench, etc.

If a modification of the layer(s) of the defined layers could improve operational performance, such as improving the gate fidelity to exceed the threshold value, then layer engine 203 modifies one or more layers of the defined layers of the two qubit gates that operate in parallel in a manner that may result in the operational performance of the two qubit gates in such a layer to exceed the threshold value. Upon modifying the one or more layers of the defined layers of the two qubit gates that operate in parallel, the gate length of the two qubit gates in each layer of the defined layers is calibrated to correspond to the same length as discussed above.

If, however, a modification of the layer(s) of the defined layers could not improve operational performance, then evaluation engine 202 adjusts the qubit frequency as discussed above.

Furthermore, if the operational performance of the two qubit gates in the layer of the defined layers does exceed the threshold value (e.g., 99%), then evaluation engine 203 deploys the two qubit gates in the layer of the defined layers to perform at least a portion of the quantum operation.

In this manner, two qubit gates that operate in parallel are effectively calibrated in a manner that results in better gate fidelities, fewer frequency collisions and fewer undesirable transitions.

A further description of these and other functions is provided below in connection with the discussion of the method for calibrating two qubit gates that operate in parallel.

Prior to the discussion of the method for calibrating two qubit gates that operate in parallel, a description of the hardware configuration of classical computer 102 (FIG. 1) is provided below in connection with FIG. 4.

Figure 4:
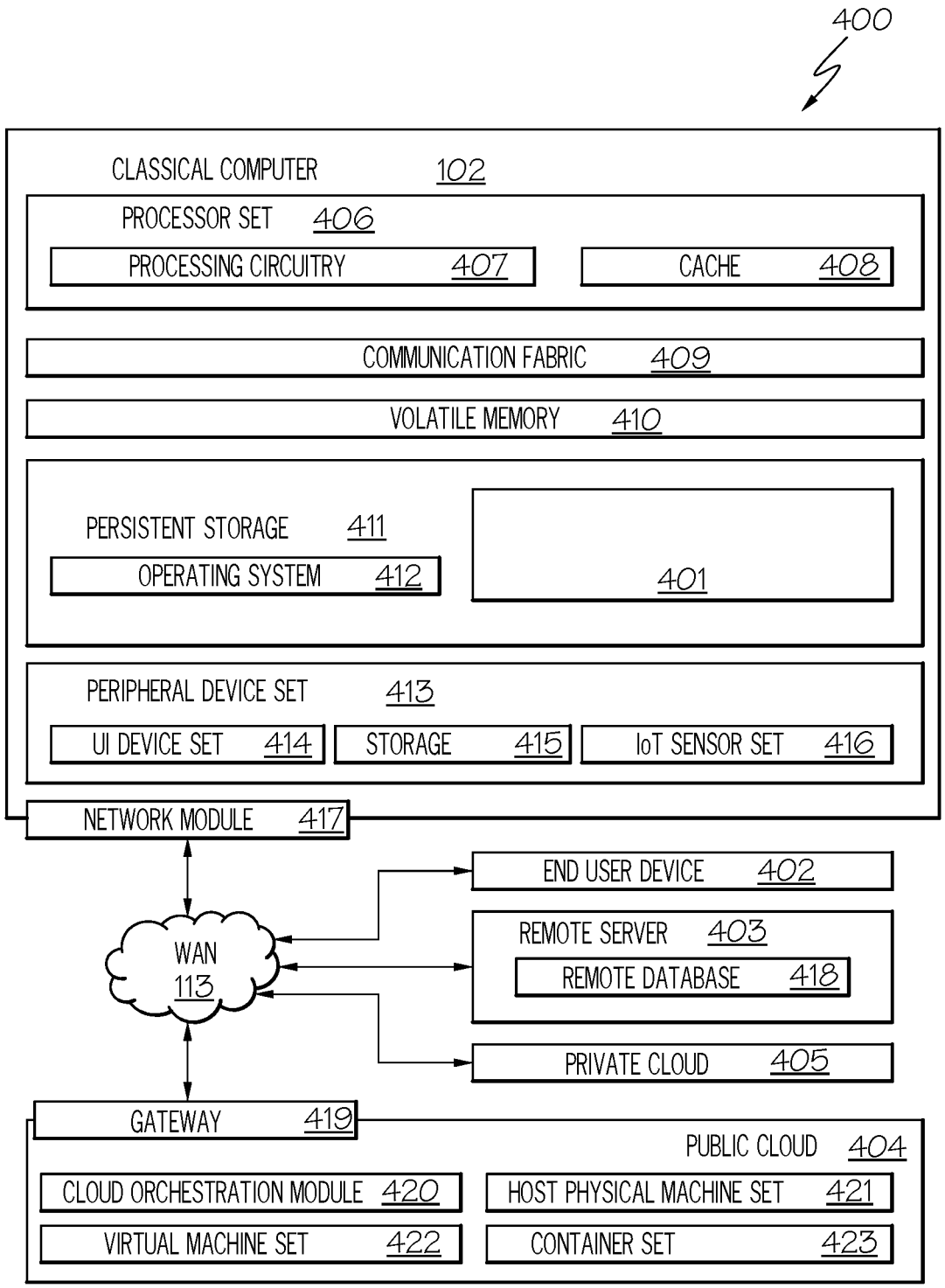
FIG. 4 illustrates an embodiment of the present disclosure of the hardware configuration of the classical computer which is representative of a hardware environment for practicing the present disclosure.

Referring now to FIG. 4, in conjunction with FIG. 1, FIG. 4 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code 401 involved in performing the inventive methods, such as calibrating two qubit gates that operate in parallel. In addition to block 401, computing environment 400 includes, for example, classical computer 102, network 113, such as a wide area network (WAN), end user device (EUD) 402, remote server 403, public cloud 404, and private cloud 405. In this embodiment, classical computer 102 includes processor set 406 (including processing circuitry 407 and cache 408), communication fabric 409, volatile memory 410, persistent storage 411 (including operating system 412 and block 401, as identified above), peripheral device set 413 (including user interface (UI) device set 414, storage 415, and Internet of Things (IoT) sensor set 416), and network module 417. Remote server 403 includes remote database 418. Public cloud 404 includes gateway 419, cloud orchestration module 420, host physical machine set 421, virtual machine set 422, and container set 423.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 418. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically classical computer 102, to keep the presentation as simple as possible. Classical computer 102 may be located in a cloud, even though it is not shown in a cloud in FIG. 4. On the other hand, classical computer 102 is not required to be in a cloud except to any extent as may be affirmatively indicated.

Processor set 406 includes one, or more, computer processors of any type now known or to be developed in the future. Processing circuitry 407 may be distributed over multiple packages, for example, multiple, coordinated integrated circuit chips. Processing circuitry 407 may implement multiple processor threads and/or multiple processor cores. Cache 408 is memory that is located in the processor chip package(s) and is typically used for data or code that should be available for rapid access by the threads or cores running on processor set 406. Cache memories are typically organized into multiple levels depending upon relative proximity to the processing circuitry. Alternatively, some, or all, of the cache for the processor set may be located "off chip." In some computing environments, processor set 406 may be designed for working with qubits and performing quantum computing.

Computer readable program instructions are typically loaded onto classical computer 102 to cause a series of operational steps to be performed by processor set 406 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 408 and the other storage media discussed below. The program instructions, and associated data, are accessed by processor set 406 to control and direct performance of the inventive methods. In computing environment 400, at least some of the instructions for performing the inventive methods may be stored in block 401 in persistent storage 411.

Communication fabric 409 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 410 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 410 is located in a single package and is internal to classical computer 102, but, alternatively or additionally, the volatile memory may be distributed over multiple packages and/or located externally with respect to classical computer 102.

Persistent Storage 411 is any form of non-volatile storage for computers that is now known or to be developed in the future. The non-volatility of this storage means that the stored data is maintained regardless of whether power is being supplied to classical computer 102 and/or directly to persistent storage 411. Persistent storage 411 may be a read only memory (ROM), but typically at least a portion of the persistent storage allows writing of data, deletion of data and re-writing of data. Some familiar forms of persistent storage include magnetic disks and solid state storage devices. Operating system 412 may take several forms, such as various known proprietary operating systems or open source Portable Operating System Interface type operating systems that employ a kernel. The code included in block 401 typically includes at least some of the computer code involved in performing the inventive methods.

Peripheral device set 413 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 414 may include components such as a display screen, speaker, microphone, wearable devices (such as goggles and smart watches), keyboard, mouse, printer, touchpad, game controllers, and haptic devices. Storage 415 is external storage, such as an external hard drive, or insertable storage, such as an SD card. Storage 415 may be persistent and/or volatile. In some embodiments, storage 415 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 416 is made up of sensors that can be used in Internet of Things applications. For example, one sensor may be a thermometer and another sensor may be a motion detector.

Network module 417 is the collection of computer software, hardware, and firmware that allows classical computer 102 to communicate with other computers through WAN 113. Network module 417 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 417 are performed on the same physical hardware device. In other embodiments (for example, embodiments that utilize software-defined networking (SDN)), the control functions and the forwarding functions of network module 417 are performed on physically separate devices, such that the control functions manage several different network hardware devices. Computer readable program instructions for performing the inventive methods can typically be downloaded to classical computer 102 from an external computer or external storage device through a network adapter card or network interface included in network module 417.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 402 is any computer system that is used and controlled by an end user (for example, a customer of an enterprise that operates classical computer 102), and may take any of the forms discussed above in connection with classical computer 102. EUD 402 typically receives helpful and useful data from the operations of classical computer 102. For example, in a hypothetical case where classical computer 102 is designed to provide a recommendation to an end user, this recommendation would typically be communicated from network module 417 of classical computer 102 through WAN 113 to EUD 402. In this way, EUD 402 can display, or otherwise present, the recommendation to an end user. In some embodiments, EUD 402 may be a client device, such as thin client, heavy client, mainframe computer, desktop computer and so on.

Remote server 403 is any computer system that serves at least some data and/or functionality to classical computer 102. Remote server 403 may be controlled and used by the same entity that operates classical computer 102. Remote server 403 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 418 of remote server 403.

Public cloud 404 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 404 is performed by the computer hardware and/or software of cloud orchestration module 420. The computing resources provided by public cloud 404 are typically implemented by virtual computing environments that run on various computers making up the computers of host physical machine set 421, which is the universe of physical computers in and/or available to public cloud 404. The virtual computing environments (VCEs) typically take the form of virtual machines from virtual machine set 422 and/or containers from container set 423. It is understood that these VCEs may be stored as images and may be transferred among and between the various physical machine hosts, either as images or after instantiation of the VCE. Cloud orchestration module 420 manages the transfer and storage of images, deploys new instantiations of VCEs and manages active instantiations of VCE deployments. Gateway 419 is the collection of computer software, hardware, and firmware that allows public cloud 404 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 405 is similar to public cloud 404, except that the computing resources are only available for use by a single enterprise. While private cloud 405 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 404 and private cloud 405 are both part of a larger hybrid cloud.

Block 401 further includes the software components discussed above in connection with FIGS. 2, 3A and 3B to calibrate two qubit gates that operate in parallel. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for calibrating two qubit gates that operate in parallel, may be embodied in an application specific integrated circuit.

As stated above, the building blocks of quantum circuits are quantum logic gates (or simply referred to herein as "quantum gates" or "gates") which operate on a small number of qubits. Unlike many classical logic gates, quantum logic gates are reversible. It is possible to perform classical computing using only reversible gates. For example, the reversible Toffoli gate can implement all Boolean functions, often at the cost of having to use ancilla bits. The Toffoli gate has a direct quantum equivalent, showing that quantum circuits can perform all operations performed by classical circuits. In certain quantum devices (devices whose functionality or principles of operation depend essentially on quantum mechanical effects), the quantum circuits may utilize cross-resonance (CR) gates. A CR gate is a microwave-active two qubit gate performed by driving one of the qubits (control) at the frequency of the other qubit (target). The qubits are connected through effective capacitors in a superconducting circuit. The CR drive protocol produces entanglement between the qubits mainly through an interaction of the form ZX (rotation of the two-qubit wavefunction around the Z-X axis). As the size of quantum devices becomes larger and larger by utilizing a larger number of quantum circuits, such devices may exploit the parallel operation of two qubit quantum gates, such as the parallel operation of CR gates. In order to optimize the CR gate fidelity, such CR gates need to be calibrated. The gate fidelity is a metric of the accuracy of the quantum gate. That is, gate fidelity is a measure of how close the final quantum state of the real-life qubit is to the ideal case. If the fidelity of the quantum gate is too low, calculations will fail because errors will accumulate faster than they can be corrected. Calibration is a technique to reduce systematic errors in quantum circuits. Quantum gates, such as CR gates, are currently calibrated (e.g., adjusting gate pulse parameters) using the "as fast as possible" (AFAP) calibration technique to reduce errors (e.g., errors associated with qubit decay or loss of phase information) which involves calibrating the CR gates to perform its operation as fast as possible. Such a technique is beneficial in locating a patch, which represents a set of qubits required for a given quantum circuit in the quantum device. The selected patch may include faster gates compared with other possible patches thereby providing higher quality results for the limited coherence time of qubits. However, in quantum circuits containing a large number of quantum gates, such as CR gates, especially for those quantum circuits performing parallel two qubit gate operations, the length of each parallel two qubit gate operation is eventually limited by the quantum gate (e.g., CR gate) with the slowest operation speed. Therefore, the quantum circuit with parallel two qubit gate operations may not benefit from the fast gates tuned up by the AFAP calibration technique as the parallel operation results in additional idle time for those fast gates until the slowest gate of that particular parallel operation has completed its operation. Furthermore, quantum devices, such as CR devices, suffer from frequency collisions, in which the ZX may be suppressed or other undesirable effects arise. Unfortunately, the current AFAP calibration technique may fail to address such collisions. Among the possible collisions mentioned above, in the parallel two qubit gate operation setting, other non-ideal two-photon processes that induce undesirable transitions can occur. When such undesirable transitions occur, the error rate may increase. Unfortunately, the current AFAP calibration technique fails to address such undesirable transitions.

The embodiments of the present disclosure provide the means for effectively calibrating two qubit gates that operate in parallel in a manner that results in better gate fidelities, fewer frequency collisions and fewer undesirable transitions as discussed below in connection with FIGS. 5A-5B.

Figure 5A:
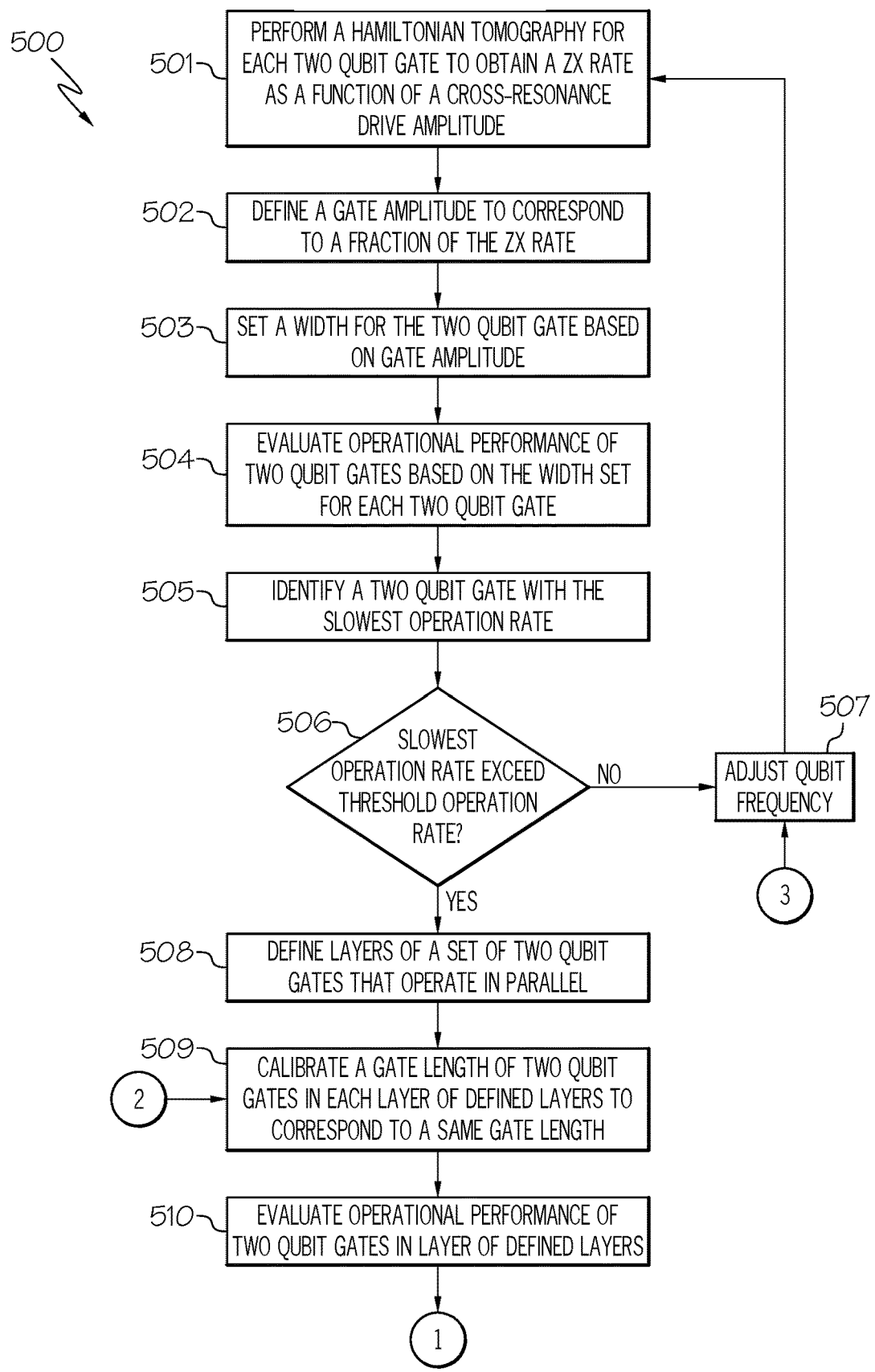
FIGS. 5A-5B are a flowchart of a method for effectively calibrating two qubit gates that operate in parallel in accordance with an embodiment of the present disclosure.
Figure 5B:
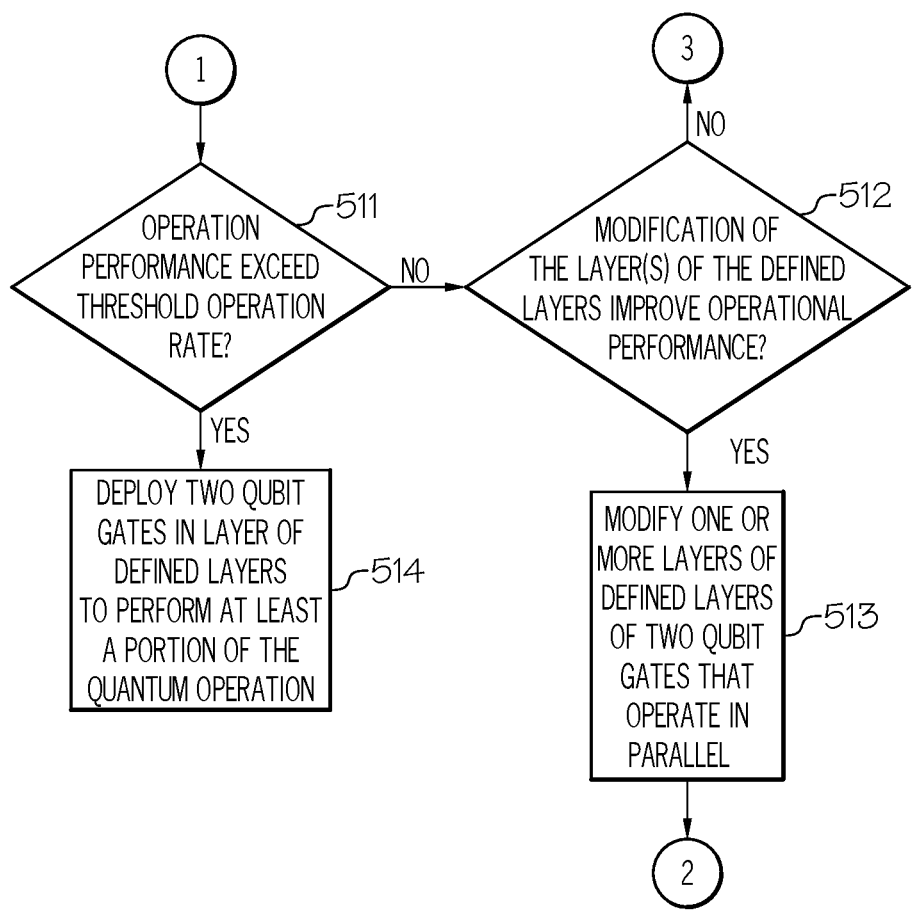

FIGS. 5A-5B are a flowchart of a method 500 for effectively calibrating two qubit gates that operate in parallel in accordance with an embodiment of the present disclosure.

Referring to FIG. 5A, in conjunction with FIGS. 1-2, 3A-3B and 4, in step 501, calibration engine 201 of classical computer 102 performs an initial calibration of the two qubit gates (e.g., CR gates) of the quantum circuit (e.g., quantum circuit 109) by performing a Hamiltonian tomography for each two qubit gate to obtain a ZX rate (rotation of the two-qubit wavefunction around the Z-X axis) as a function of the cross-resonance drive amplitude. Hamiltonian tomography, as used herein, refers to performing tomography on a two-qubit gate operation to obtain the ZX rate.

As discussed above, in one embodiment, such two qubit gates correspond to CR gates. In one embodiment, such CR gates correspond to echoed-CR gates. An echoed-CR gate, as used herein, refers to a CR gate that is operated by a π pulse on the control qubit and a change of sign of the CR drive. In such a scheme, an echo pulse sequence is utilized, which consists of two CR pulses with opposite amplitude, accompanied with π rotations on the control qubit. The echo creates constructive/destructive interference between the effective gate parameters.

In step 502, calibration engine 201 of classical computer 102 defines the gate amplitude as corresponding to a user-designated fraction (e.g., half) of the ZX rate.

In step 503, calibration engine 201 of classical computer 102 sets a width of the two qubit gate (e.g., CR gate) based on the gate amplitude. The "width," as used herein, refers to the frequency range of operation.

In step 504, after utilizing the Hamiltonian tomography for deciding the width for each two qubit gate utilized by the quantum circuit (e.g., quantum circuit 109), evaluation engine 202 of classical computer 102 evaluates the operational performance (e.g., gate speed, fidelity (accuracy), two-qubit gate error, etc.) of the two qubit gates based on the width set for each two qubit gate. For example, evaluation engine 202 may evaluate the gate speed of the two qubit gates based on the width set for each two qubit gate. The "gate speed" (also referred to herein as the "operation speed"), as used herein, refers to the execution rate of the gate (e.g., 20 ns). That is, the "gate speed" corresponds to the duration of time it takes the quantum gate to operate on the qubits, such as two qubits for the two qubit gate.

As discussed above, in one embodiment, evaluation engine 202 performs such an evaluation using various software tools, including, but not limited to, Benchmarking Suite by QPL, Quantum Benchmark by Keysight Technologies®, MQT Bench, etc.

In step 505, based on evaluating the gate speed (operation speed), evaluation engine 202 of classical computer 102 identifies the two qubit gate with the slowest operation speed. That is, evaluation engine 202 identifies the two qubit gate with the lowest operation speed.

In step 506, evaluation engine 202 of classical computer 102 determines whether the identified slowest operation speed exceeds a user-designated threshold gate speed to ensure that the quantum circuit (e.g., quantum circuit 109) operates at least above a minimum speed of operation.

As discussed above, in quantum circuits containing a large number of quantum gates, such as CR gates, especially for those quantum circuits performing parallel two qubit gate operations, the performance of the quantum circuit is limited by the quantum gate with the slowest operation speed. As a result, by ensuring that the two qubit gate with the slowest operation speed exceeds a minimum speed of operation (user-designated threshold), it is ensured that the performance of the quantum circuit exceeds such a minimum speed of operation. Hence, the overall performance of the quantum circuit can be improved by ensuring that it performs no slower than the minimum speed of operation that is exceeded by the two qubit gate with the slowest operation speed.

If the operation speed of the two qubit gate with the slowest operation speed does not exceed the threshold gate speed, which may be user-designated, then, in step 507, evaluation engine 202 of classical computer 102 adjusts the qubit frequency. For example, the qubit frequency may be adjusted from 5.100 GHz to 5.110 GHz.

As stated above, in one embodiment, evaluation engine 202 adjusts the qubit frequency by modifying a small magnetic field applied to the quantum device (e.g., quantum computer 101) with the quantum circuit (e.g., quantum circuit 109) of the two qubit gates previously evaluated.

In one embodiment, evaluation engine 202 adjusts the qubit frequency using a bias current from control and measurement plane 105.

In one embodiment, evaluation engine 202 adjusts the qubit frequency using laser-annealing, in which a laser beam is applied to the Josephson junction (JJ) in order to tune the qubit frequency.

Upon adjusting the qubit frequency, calibration engine 201 calibrates the two qubit gates (e.g., CR gates) of the quantum circuit (e.g., quantum circuit 109) operating at the adjusted qubit frequency by performing a Hamiltonian tomography in step 501.

If, however, the operation speed of the two qubit gate with the slowest operation speed exceeds the threshold gate speed, which may be user-designated, then, in step 508, layer engine 203 of classical computer 102 defines the layers of a set of two qubit gates that operate in parallel. A "layer," as used herein, refers to a set (a collection) of two qubit gates that operate in parallel, including simultaneously. Each layer may be used to perform a portion of the quantum operation.

As discussed above, in one embodiment, the layer definition includes a directionality of the two qubit gates in each layer of the defined layers. In one embodiment, directionality specifies which of the two qubits correspond to a drive control qubit and which of the two qubits correspond to a target qubit. The drive control qubit is used to encode the logical qubit. The state of the target qubit is based on the state of the control qubit.

In one embodiment, layer engine 203 defines each layer of operation to perform a portion of an operation by batching two qubit gates in parallel. In one embodiment, such layers are based on the type of topology to be implemented. For example, in the heavy-hex topology, there is a minimum of 3 layers of two qubit gates that are batched together.

In one embodiment, such layers of operation are defined based on qubit frequency arrangements and collision counting. A "collision," as used herein, refers to a frequency collision in which neighboring qubits having the wrong detuning will exhibit a frequency collision in which the ZX may be suppressed or other undesirable effects arise.

In one embodiment, layer engine 203 estimates the collisions based on the Monte Carlo frequency-crowding model as a function of $6f$. In one embodiment, it is assumed that the qubit frequencies are distributed normally around their design frequencies with standard deviation $6f$.

In one embodiment, layer engine 203 estimates the collisions based on simulating the probability of frequency collisions between gate transitions based on the two qubit gates driven by parametric modulation of tunable couplers.

In one embodiment, two qubit gates are batched together in a layer of operation based on being operated at the same or substantially similar qubit frequency and/or based on having the minimal amount of collisions by being batched together.

In step 509, calibration engine 201 of classical computer 102 calibrates a gate length of the two qubit gates in each layer of the defined layers to correspond to the same gate length.

As stated above, in one embodiment, calibration engine 201 calibrates the gate length of the two qubit gates in each layer of the defined layers to correspond to the same gate length as the gate length of the two qubit gate in that layer with the slowest operation speed. In one embodiment, the gate length of the two qubit gates in each layer of the defined layers is calibrated to a different gate length.

In this manner, by having the two qubit gates with the same identical gate length, gate calibrations can be parallelized based on error amplification sequences, which could reduce calibration time as well as calibrate out the error associated with simultaneous two qubit gate operations thereby improving gate fidelities.

Furthermore, in this manner, by having the two qubit gates with the same gate length as the gate length of the two qubit gate in that layer with the slowest operation speed, collisions suffered from CR devices are reduced thereby improving gate fidelities. For example, by slowing the operations of the two qubit gates, the collision bounds are relaxed and the strength of the stark effect (change in the quantized energy in a qubit when an electrical field is applied across the qubit) is reduced thereby reducing collisions.

Additionally, in this manner, by having the two qubit gates with the same gate length as the gate length of the two qubit gate in that layer with the slowest operation speed, errors caused by undesirable transitions from parallel two qubit gate operations are reduced thereby improving gate fidelities.

In one embodiment, layer engine 203 optimizes calibrations for different circuit topologies on the same device map. In one embodiment, layer engine 203 implements different optimal layers for different topologies of the qubits. In one embodiment, different optimal layers may utilize a different slowest gate. Hence, the optimal gate speeds may vary across the layers.

An illustration of the different layers of operation for different topologies is provided in FIGS. 3A-3B.

As shown in FIG. 3A, which illustrates a two-dimensional topology, two qubit gates 301 are batched into layer 1 (302), layer 2 (303) and layer 3 (304).

As shown in FIG. 3B, which illustrates a one-dimensional topology, two qubit gates 301 are batched into layer 1 (302) and layer 2 (303).

In one embodiment, layer engine 203 utilizes various software tools for defining such layers of operations, including, but not limited to, TensorFlow® Quantum, Cirq® Quantum Software Framework, etc.

Upon calibrating the gate length of the two qubit gates in each layer of the defined layers to correspond to the same gate length, such as the gate length of the slowest gate, in step 510, evaluation engine 202 of classical computer 102 evaluates the operation performance (e.g., fidelity, two-qubit gate error, etc.) of the two qubit gates in each of the defined layers.

As discussed above, in one embodiment, evaluation engine 202 performs such an evaluation using various software tools, including, but not limited to, Benchmarking Suite by QPL, Quantum Benchmark by Keysight Technologies®, MQT Bench, etc.

Referring now to FIG. 5B, in conjunction with FIGS. 1-2, 3A-3B and 4, in step 511, evaluation engine 202 of classical computer 102 determines whether the operational performance (e.g., gate fidelity) of the two qubit gates in each of the defined layers exceeds a threshold value (e.g., 99%), which may be user-designated. As discussed above, gate fidelity is a metric of the accuracy of the quantum gate. That is, gate fidelity is a measure of how close the final quantum state of the real-life qubit is to the ideal case.

If the operational performance of the two qubit gates in the layer of the defined layers does not exceed the threshold value (e.g., 99%), then, in step 512, evaluation engine 202 of classical computer 102 determines whether a modification of the layers of the defined layers could improve operational performance.

As stated above, in one embodiment, such an evaluation is performed based on evaluating the operational performance of the two qubit gates in a layer that has been modified via simulation by layer engine 203, such as by adding or deleting two qubit gates that operate in parallel in such a layer. In one embodiment, such simulated modifications are performed by layer engine 203 utilizing various software tools for defining such layers of operations, including, but not limited to, TensorFlow® Quantum, Cirq® Quantum Software Framework, etc. In one embodiment, the performance of such simulated modifications are evaluated by evaluation engine 202 using various software tools, including, but not limited to, Benchmarking Suite by QPL, Quantum Benchmark by Keysight Technologies®, MQT Bench, etc.

If a modification of the layer(s) of the defined layers could improve operational performance, such as improving the gate fidelity to exceed the threshold value, then, in step 513, layer engine 203 of classical computer 102 modifies one or more layers of the defined layers of the two qubit gates that operate in parallel in a manner that may result in an operational performance of the two qubit gates in such a layer to exceed the threshold value. Upon modifying the one or more layers of the defined layers of the two qubit gates that operate in parallel, calibration engine 201 of classical computer calibrates the gate length of the two qubit gates in such a layer to correspond to the same length in step 509.

If, however, a modification of the layer(s) of the defined layers could not improve operational performance, then evaluation engine 202 of classical computer 102 adjusts the qubit frequency in step 507.

Referring to step 511, if, however, the operational performance of the two qubit gates in the layer of the defined layers does exceed the threshold value (e.g., 99%), then, in step 514, evaluation engine 203 of classical computer 102 deploys the two qubit gates in the layer of the defined layers to perform at least a portion of the quantum operation.

In this manner, two qubit gates that operate in parallel are effectively calibrated in a manner that results in better gate fidelities, fewer frequency collisions and fewer undesirable transitions.

Furthermore, as a result of the foregoing, gate calibrations can be parallelized based on error amplification sequences, which could reduce calibration time as well as calibrate out the error associated with simultaneous two qubit gate operations thereby improving gate fidelities. Furthermore, by having the two qubit gates with the same gate length as the gate length of the two qubit gate in that layer with the slowest operation speed, collisions suffered from CR devices are reduced thereby improving gate fidelities. For example, by slowing the operations of the two qubit gates, the collision bounds are relaxed and the strength of the stark effect (change in the quantized energy in a qubit when an electrical field is applied across the qubit) is reduced thereby reducing collisions. Additionally, by having the two qubit gates with the same gate length as the gate length of the two qubit gate in that layer with the slowest operation speed, errors caused by undesirable transitions from parallel two qubit gate operations are reduced thereby improving gate fidelities.

Furthermore, the principles of the present disclosure improve the technology or technical field involving quantum gate calibration.

As discussed above, the building blocks of quantum circuits are quantum logic gates (or simply referred to herein as "quantum gates" or "gates") which operate on a small number of qubits. Unlike many classical logic gates, quantum logic gates are reversible. It is possible to perform classical computing using only reversible gates. For example, the reversible Toffoli gate can implement all Boolean functions, often at the cost of having to use ancilla bits. The Toffoli gate has a direct quantum equivalent, showing that quantum circuits can perform all operations performed by classical circuits. In certain quantum devices (devices whose functionality or principles of operation depend essentially on quantum mechanical effects), the quantum circuits may utilize cross-resonance (CR) gates. A CR gate is a microwave-active two qubit gate performed by driving one of the qubits (control) at the frequency of the other qubit (target). The qubits are connected through effective capacitors in a superconducting circuit. The CR drive protocol produces entanglement between the qubits mainly through an interaction of the form ZX (rotation of the two-qubit wavefunction around the Z-X axis). As the size of quantum devices becomes larger and larger by utilizing a larger number of quantum circuits, such devices may exploit the parallel operation of two qubit quantum gates, such as the parallel operation of CR gates. In order to optimize the CR gate fidelity, such CR gates need to be calibrated. The gate fidelity is a metric of the accuracy of the quantum gate. That is, gate fidelity is a measure of how close the final quantum state of the real-life qubit is to the ideal case. If the fidelity of the quantum gate is too low, calculations will fail because errors will accumulate faster than they can be corrected. Calibration is a technique to reduce systematic errors in quantum circuits. Quantum gates, such as CR gates, are currently calibrated (e.g., adjusting gate pulse parameters) using the "as fast as possible" (AFAP) calibration technique to reduce errors (e.g., errors associated with qubit decay or loss of phase information) which involves calibrating the CR gates to perform its operation as fast as possible. Such a technique is beneficial in locating a patch, which represents a set of qubits required for a given quantum circuit in the quantum device. The selected patch may include faster gates compared with other possible patches thereby providing higher quality results for the limited coherence time of qubits. However, in quantum circuits containing a large number of quantum gates, such as CR gates, especially for those quantum circuits performing parallel two qubit gate operations, the length of each parallel two qubit gate operation is eventually limited by the quantum gate (e.g., CR gate) with the slowest operation speed. Therefore, the quantum circuit with parallel two qubit gate operations may not benefit from the fast gates tuned up by the AFAP calibration technique as the parallel operation results in additional idle time for those fast gates until the slowest gate of that particular parallel operation has completed its operation. Furthermore, quantum devices, such as CR devices, suffer from frequency collisions, in which the ZX may be suppressed or other undesirable effects arise. Unfortunately, the current AFAP calibration technique may fail to address such collisions. Among the possible collisions mentioned above, in the parallel two qubit gate operation setting, other non-ideal two-photon processes that induce undesirable transitions can occur. When such undesirable transitions occur, the error rate may increase. Unfortunately, the current AFAP calibration technique fails to address such undesirable transitions.

Embodiments of the present disclosure improve such technology by defining layers of two qubit gates that operate in parallel. A "layer," as used herein, refers to a set of two qubit gates that operate in parallel, including simultaneously. Each layer may be used to perform a portion of the quantum operation. In one embodiment, such layers of operation are defined based on qubit frequency arrangements and collision counting. In one embodiment, a gate length for each two qubit gate in a layer of the defined layers is calibrated to correspond to the same gate length. In one embodiment, the gate length of the two qubit gates in each layer of the defined layers is calibrated to correspond to the same gate length as the gate length of the two qubit gate in that layer with the slowest operation speed. A portion of the quantum operation is performed by the two qubit gates in the layer with the calibrated gate length. In this manner, by having the two qubit gates with the same identical gate length, gate calibrations can be parallelized based on error amplification sequences, which could reduce calibration time as well as calibrate out the error associated with simultaneous two qubit gate operations thereby improving gate fidelities. Furthermore, in this manner, by having the two qubit gates with the same gate length as the gate length of the two qubit gate in that layer with the slowest operation speed, collisions suffered from CR devices are reduced thereby improving gate fidelities. For example, by slowing the operations of the two qubit gates, the collision bounds are relaxed and the strength of the stark effect (change in the quantized energy in a qubit when an electrical field is applied across the qubit) is reduced thereby reducing collisions. Additionally, in this manner, by having the two qubit gates with the same gate length as the gate length of the two qubit gate in that layer with the slowest operation speed, errors caused by undesirable transitions from parallel two qubit gate operations are reduced thereby improving gate fidelities. Furthermore, in this manner, there is an improvement in the technical field involving quantum gate calibration.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a method for calibrating a quantum operation comprises defining layers of a collection of two qubit gates that operate in parallel. The method further comprises calibrating a gate length of two qubit gates in a layer of the defined layers to correspond to a same gate length. The method additionally comprises performing at least a portion of the quantum operation by the two qubit gates in the layer of the defined layers with the calibrated gate length.

Additionally, in one embodiment of the present disclosure, the gate length of the two qubit gates in the layer of the defined layers is calibrated to correspond to a gate length of a two qubit gate in the layer with a slowest operation speed.

Furthermore, in one embodiment of the present disclosure, the defined layers comprise directionality of two qubit gates in each layer of the defined layers, where the directionality specifies which of the two qubits correspond to a drive control qubit and which of the two qubits correspond to a target qubit.

Additionally, in one embodiment of the present disclosure, the method further comprises performing a Hamiltonian tomography on a two qubit gate to obtain a ZX rate as a function of a cross-resonance drive amplitude. The method additionally comprises defining a gate amplitude to correspond to a fraction of the ZX rate. Furthermore, the method comprises setting a width of the two qubit gate based on the gate amplitude.

Furthermore, in one embodiment of the present disclosure, the method additionally comprises evaluating operational performance of a plurality of two qubit gates based on the width set for each of the plurality of two qubit gates. The method further comprises identifying a two qubit gate of the plurality of two qubit gates with a slowest operation speed.

Additionally, in one embodiment of the present disclosure, the method further comprises defining layers of the plurality of two qubit gates in response to the two qubit state with the slowest operation speed exceeding a threshold gate speed.

Furthermore, in one embodiment of the present disclosure, the method additionally comprises evaluating operational performance of the two qubit gates in the layer of the defined layers. The method further comprises deploying the two qubit gates in the layer of the defined layers to perform at least the portion of the quantum operation in response to the operational performance exceeding a threshold value. Furthermore, the method comprises modifying one or more layers of the defined layers of the collection of two qubit gates that operate in parallel in response to the operational performance not exceeding the threshold value.

Other forms of the embodiments of the method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for calibrating a quantum operation, the method comprising:
defining layers of a collection of two qubit gates that operate in parallel;
calibrating a gate length of two qubit gates in a layer of said defined layers to correspond to a same gate length; and
performing at least a portion of said quantum operation by said two qubit gates in said layer of said defined layers with said calibrated gate length.

2. The method as recited in claim 1, wherein said gate length of said two qubit gates in said layer of said defined layers is calibrated to correspond to a gate length of a two qubit gate in said layer with a slowest operation speed.

3. The method as recited in claim 1, wherein said defined layers comprise directionality of two qubit gates in each layer of said defined layers, wherein said directionality specifies which of said two qubits correspond to a drive control qubit and which of said two qubits correspond to a target qubit.

4. The method as recited in claim 1 further comprising:
performing a Hamiltonian tomography on a two qubit gate to obtain a ZX rate as a function of a cross-resonance drive amplitude;
defining a gate amplitude to correspond to a fraction of said ZX rate; and
setting a width of said two qubit gate based on said gate amplitude.

5. The method as recited in claim 4 further comprising:
evaluating operational performance of a plurality of two qubit gates based on said width set for each of said plurality of two qubit gates; and
identifying a two qubit gate of said plurality of two qubit gates with a slowest operation speed.

6. The method as recited in claim 5 further comprising:
defining layers of said plurality of two qubit gates in response to said two qubit state with said slowest operation speed exceeding a threshold gate speed.

7. The method as recited in claim 1 further comprising:
evaluating operational performance of said two qubit gates in said layer of said defined layers;
deploying said two qubit gates in said layer of said defined layers to perform at least said portion of said quantum operation in response to said operational performance exceeding a threshold value; and
modifying one or more layers of said defined layers of said collection of two qubit gates that operate in parallel in response to said operational performance not exceeding said threshold value.

8. The method as recited in claim 1, wherein a gate length of two qubit gates in each layer of said defined layers is calibrated to a different gate length.

9. A computer program product for calibrating a quantum operation, the computer program product comprising one or more computer readable storage mediums having program code embodied therewith, the program code comprising programming instructions for:
defining layers of a collection of two qubit gates that operate in parallel;
calibrating a gate length of two qubit gates in a layer of said defined layers to correspond to a same gate length; and
performing at least a portion of said quantum operation by said two qubit gates in said layer of said defined layers with said calibrated gate length.

10. The computer program product as recited in claim 9, wherein said gate length of said two qubit gates in said layer of said defined layers is calibrated to correspond to a gate length of a two qubit gate in said layer with a slowest operation speed.

11. The computer program product as recited in claim 9, wherein said defined layers comprise directionality of two qubit gates in each layer of said defined layers, wherein said directionality specifies which of said two qubits correspond to a drive control qubit and which of said two qubits correspond to a target qubit.

12. The computer program product as recited in claim 9, wherein the program code further comprises the programming instructions for:
performing a Hamiltonian tomography on a two qubit gate to obtain a ZX rate as a function of a cross-resonance drive amplitude;
defining a gate amplitude to correspond to a fraction of said ZX rate; and
setting a width of said two qubit gate based on said gate amplitude.

13. The computer program product as recited in claim 12, wherein the program code further comprises the programming instructions for:
evaluating operational performance of a plurality of two qubit gates based on said width set for each of said plurality of two qubit gates; and
identifying a two qubit gate of said plurality of two qubit gates with a slowest operation speed.

14. A system, comprising:
a memory for storing a computer program for calibrating a quantum operation; and
a processor connected to said memory, wherein said processor is configured to execute program instructions of the computer program comprising:
defining layers of a collection of two qubit gates that operate in parallel;
calibrating a gate length of two qubit gates in a layer of said defined layers to correspond to a same gate length; and
performing at least a portion of said quantum operation by said two qubit gates in said layer of said defined layers with said calibrated gate length.

15. The system as recited in claim 14, wherein said gate length of said two qubit gates in said layer of said defined layers is calibrated to correspond to a gate length of a two qubit gate in said layer with a slowest operation speed.

16. The system as recited in claim 14, wherein said defined layers comprise directionality of two qubit gates in each layer of said defined layers, wherein said directionality specifies which of said two qubits correspond to a drive control qubit and which of said two qubits correspond to a target qubit.

17. The system as recited in claim 14, wherein the program instructions of the computer program further comprise:
performing a Hamiltonian tomography on a two qubit gate to obtain a ZX rate as a function of a cross-resonance drive amplitude;

defining a gate amplitude to correspond to a fraction of said ZX rate; and setting a width of said two qubit gate based on said gate amplitude.

18. The system as recited in claim 17, wherein the program instructions of the computer program further comprise:

evaluating operational performance of a plurality of two qubit gates based on said width set for each of said plurality of two qubit gates; and identifying a two qubit gate of said plurality of two qubit gates with a slowest operation speed.

19. The system as recited in claim 18, wherein the program instructions of the computer program further comprise:

defining layers of said plurality of two qubit gates in response to said two qubit state with said slowest operation speed exceeding a threshold gate speed.

20. The system as recited in claim 14, wherein a gate length of two qubit gates in each layer of said defined layers is calibrated to a different gate length.

* * * * *